US012670908B2

(12) United States Patent
Yabas et al.

(10) Patent No.: US 12,670,908 B2
(45) Date of Patent: **\*Jun. 30, 2026**

(54) ENABLING NATURAL LANGUAGE INTERACTIONS WITH USER INTERFACES FOR USERS OF A SOFTWARE APPLICATION

(71) Applicant: SoundHound AI IP, LLC, Santa Clara, CA (US)

(72) Inventors: Utku Yabas, Toronto (CA); Philipp Hubert, Toronto (CA); Karl Stahl, Palo Alto, CA (US)

(73) Assignee: SOUNDHOUND AI IP, LLC, Santa Clara, CA (US)

( \* ) Notice: Subject to any disclaimer, the term of this patent is extended or adjusted under 35 U.S.C. 154(b) by 11 days.

This patent is subject to a terminal disclaimer.

(21) Appl. No.: 18/739,011

(22) Filed: Jun. 10, 2024

(65) Prior Publication Data

US 2024/0331697 A1 Oct. 3, 2024

Related U.S. Application Data

(63) Continuation of application No. 17/332,927, filed on May 27, 2021, now Pat. No. 12,008,991.

(51) Int. Cl.
*G06F 40/284* (2020.01)
*G06F 40/211* (2020.01)
(Continued)

(52) U.S. Cl.
CPC ............ *G10L 15/22* (2013.01); *G06F 40/211* (2020.01); *G06F 40/284* (2020.01);
(Continued)

(58) Field of Classification Search
None
See application file for complete search history.

(56) References Cited

U.S. PATENT DOCUMENTS

| | | | |
|---|---|---|---|
| 7,840,400 B2 | 11/2010 | Lavi et al. | |
| 10,521,189 B1 * | 12/2019 | Ryabov | ................ G06F 40/117 |

(Continued)

OTHER PUBLICATIONS

Han, S. et al., "A Voice-Controlled Web Browser to Navigate Hierarchical Hidden Menus of Web Pages in a Smart-TV Environment," In Proceedings of the 23rd International Conference on World Wide Web, Apr. 7-11, 2014, pp. 587-589.

(Continued)

*Primary Examiner* — Seong-Ah A Shin
(74) *Attorney, Agent, or Firm* — Pearl Cohen Zedek Latzer Baratz LLP

(57) ABSTRACT

A user specifies a natural language command to a device. Software on the device generates contextual metadata about the user interface of the device, such as data about all visible elements of the user interface, and sends the contextual metadata along with the natural language command to a natural language understanding engine. The natural language understanding engine parses the natural language query using a stored grammar (e.g., a grammar provided by a maker of the device) and as a result of the parsing identifies information about the command (e.g., the user interface elements referenced by the command) and provides that information to the device. The device uses that provided information to respond to the command.

16 Claims, 6 Drawing Sheets

(51) Int. Cl.

| | |
|---|---|
| *G10L 15/183* | (2013.01) |
| *G10L 15/22* | (2006.01) |
| *G10L 15/26* | (2006.01) |

(52) U.S. Cl.

CPC ............ *G10L 15/183* (2013.01); *G10L 15/26* (2013.01); *G10L 2015/223* (2013.01)

(56) References Cited

U.S. PATENT DOCUMENTS

| | | | |
|---|---|---|---|
| 11,200,892 B1 * | 12/2021 | Stoops | .................... G06F 3/167 |
| 11,481,188 B1 * | 10/2022 | Pisipati | ................... G06F 9/542 |
| 11,531,789 B1 * | 12/2022 | Eberhardt | ................ G01S 5/18 |
| 11,610,579 B2 * | 3/2023 | Bapna | ................... G06N 3/084 |
| 11,610,585 B2 * | 3/2023 | Sindhwani | ............ G06F 40/169 |
| 2010/0009720 A1 * | 1/2010 | Cha | ....................... G06F 1/1624 |
| | | | 704/235 |
| 2013/0007057 A1 * | 1/2013 | Li | .................... H04N 21/44213 |
| | | | 707/769 |
| 2014/0052450 A1 * | 2/2014 | Cheong | ........... H04N 21/42203 |
| | | | 704/E21.001 |
| 2014/0095167 A1 * | 4/2014 | Lynch | ..................... G10L 21/10 |
| | | | 704/270.1 |
| 2015/0382047 A1 * | 12/2015 | Van Os | ................... G06F 3/167 |
| | | | 725/38 |
| 2020/0135191 A1 * | 4/2020 | Nourbakhsh | ........... G10L 15/22 |
| 2020/0219501 A1 * | 7/2020 | Cartwright | ............ G06F 3/0346 |
| 2020/0365154 A1 * | 11/2020 | Sindhwani | .............. G06F 3/167 |
| 2021/0082412 A1 * | 3/2021 | Kennewick | ............. G10L 13/08 |
| 2021/0249004 A1 * | 8/2021 | Smith | ...................... G10L 15/22 |
| 2022/0120579 A1 * | 4/2022 | Li | ............................ G06F 21/32 |
| 2022/0189470 A1 * | 6/2022 | Sharifi | ................... G10L 15/08 |
| 2022/0319503 A1 * | 10/2022 | Das | ..................... G10L 15/1815 |
| 2022/0334794 A1 * | 10/2022 | Lange | .................... G10L 15/28 |
| 2022/0335935 A1 * | 10/2022 | Lange | ................... G06F 16/243 |
| 2022/0338281 A1 * | 10/2022 | Kwon | ..................... H04W 8/26 |
| 2023/0081558 A1 * | 3/2023 | Lee | .......................... G06F 40/30 |
| | | | 704/239 |

OTHER PUBLICATIONS

Su, Y., et al., "Building Natural Language Interfaces to Web APIs,", In Proceedings of the 2017 ACM on Conference on Information and Knowledge Management, Nov. 6-10, 2017, pp. 177-186.

Office Action dated Mar. 27, 2023 in U.S. Appl. No. 17/332,927.

Response to Office Action dated Jun. 27, 2023 in U.S. Appl. No. 17/332,927.

Final Office Action dated Sep. 11, 2023 in U.S. Appl. No. 17/332,927.

Response to Final Office Action dated Dec. 20, 2023 in U.S. Appl. No. 17/332,927.

Notice of Allowance dated Feb. 7, 2024 in U.S. Appl. No. 17/332,927.

* cited by examiner

ENABLING NATURAL LANGUAGE INTERACTIONS WITH USER INTERFACES FOR USERS OF A SOFTWARE APPLICATION

CLAIM OF PRIORITY

The present application is a continuation of U.S. patent application Ser. No. 17/332,927, entitled "ENABLING NATURAL LANGUAGE INTERACTIONS WITH USER INTERFACES FOR USERS OF A SOFTWARE APPLICA-TION," filed May 27, 2021, to be issued as U.S. Pat. No. 12,008,991, which application is incorporated by reference herein in its entirety.

TECHNICAL FIELD

The disclosed embodiments relate generally to natural language understanding (NLU) systems, and more specifically, to enabling users to interact with the graphical user interfaces of their applications using intuitive natural language commands.

BACKGROUND

Natural language understanding (NLU) technology is complex. For most developers of network-connected embedded systems, such as automobiles, TVs, and personal healthcare devices, it is much more feasible to add NLU functionality to their products by using a specialized NLU service from a third party than it is to attempt to design NLU functionality from scratch.

However, NLU traditionally is best-suited for use with static functionality. In contrast, for many systems the state of the system and of the user interface are dynamic, presenting different information at different times. For systems that provide users with a graphical user interface (GUI), status-specific menu, or dynamic positioning of components, there is no effective mechanism for the NLU service to respond appropriately to natural language commands based on what the system is presenting to the user at any given time via its user interface.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Natural language understanding, and especially natural language understanding integrated with speech recognition, is more accurate when there are fewer possible interpretations of an expression. Even very high-powered NLU system can struggle to correctly interpret human expressions in a natural language with millions of words that can be combined into billions of possible intents. For example, speech recognition might find the voice utterance "I would like to have Ben-Hur" indistinguishable from "I would like to have been her". Ben-Hur is a classic Hollywood film from 1959 that won a record 11 Academy Awards. As another example, an expression "Show me Ben-Hur" could be interpreted as a request to invoke playing of a movie or to display an information web page about the movie. The lack of accurate interpretation has long held back commercial implementations of voice-controlled graphical user interfaces. As another example, NLU may not be able to work effectively without proper context. For example, an expression "Play the first movie" from a user watching a smart TV displaying a list of movie results" would not be fully interpretable by NLU, without more context information.

Being more aware of what a user is likely to say can help improve NLU performance. What a user is seeing provides a high certainty clue as to what they might say. For devices with voice-controlled graphical user interfaces, the device has the information about what its user is seeing in its list of visible display elements. Providing that information to NLU and thereby vastly narrowing the set of possible user utterances to consider, makes NLU tremendously more accurate and enables new and improved applications of voice interfaces.

Figure 1:
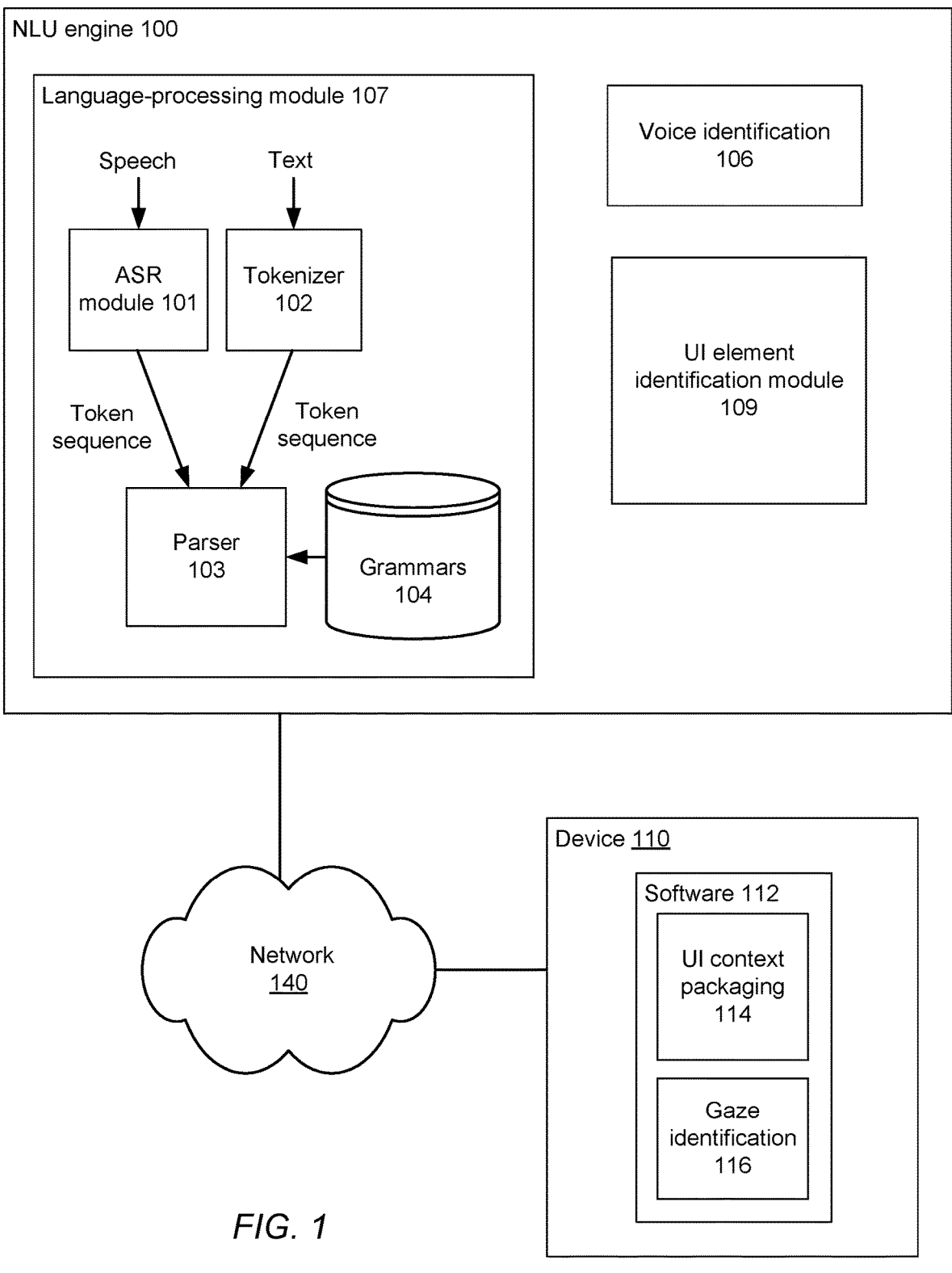
FIG. 1 shows a system environment in which natural language understanding takes place, according to one embodiment.

FIG. 1 shows a system environment in which natural language understanding takes place, according to one embodiment. Users use devices 110, such as embedded systems for automobiles, televisions, or personal healthcare devices, for purposes such as playing music within an automobile, or selecting television shows to watch. Such devices 110 may lack convenient user interfaces of their own, and/or a user may be in posture (e.g., reclining on a couch watching television, or holding the steering controls of a vehicle) not easily allowing for the manual control of a user interface. Accordingly, software 112 running on the client device delegates the natural language processing of user natural language commands to an NLU engine 100. In particular, for user natural language commands that interact with a GUI, the NLU engine 100 determines which of the elements currently visible within the GUI of the device are being referenced by the commands and provides the software of the device with information about those elements, allowing the software to take an appropriate action without the software being burdened with the ability to understand the natural language command.

In some embodiments, such as that illustrated in FIG. 1, the NLU engine 100 is part of a server system that is separate from the devices 110 and accessible over a network 140. In other embodiments, the NLU engine 100 can be installed locally on the devices 110 themselves and used by the software 112 as a local service.

As noted, the devices 110 may be embedded within systems of the user, such as a subsystem of a vehicle (e.g., part of the vehicle dash display), a portion of a set top box or a smart television, or the like. More generally, the devices 110 may be any form of software-controlled computing device with which a user may wish to interact using natural language commands. For example, the devices 110 could include smartphones, tablet computers, laptop computers, desktop computers, or the like.

Users provide natural language commands to the user's devices 110 in order to interact with the devices. Since the developers of the software 112 for the devices 110 typically lack the considerable expertise required to properly configure the software 112 to process natural language commands, the software 112 is configured to make calls (e.g., web service calls through an API) that delegate the analysis of the natural language commands to the NLU engine 100 by passing the natural language commands to the NLU engine 100. In order to provide the NLU engine with sufficient context to determine which UI element of the user interface of the device 110 is being referenced by the NL command, the software 112 includes a UI context packaging module 114 that assembles metadata about the UI elements currently visible within the user interface and provides that metadata to the NLU engine along with the natural language commands themselves. The NLU engine 100 then returns the results of the command interpretation (e.g., the identity of the UI elements referred to by the command) to the device 110.

The devices 110 may support the use of natural language commands for performing additional actions, concerning information beyond what is currently displayed in the user interfaces of the devices. As one example, a user might perform a search using a natural language command, such as with the command "Show me action movies playing now" given to a smart television.

The NLU engine 100 and the devices 110 may be implemented with various forms of hardware in different embodiments. In some embodiments, devices 110 communicate with the NLU engine 100 through a network 140. The network may be any suitable communications network for data transmission. In one embodiment, the network 140 is the Internet and uses standard communications technologies and/or protocols. In local service embodiments, the NLU engine and a device 110 may interact with no network or with a virtual network that connects software functions.

The NLU engine 100 processes language in the form of speech or of text, or both, using a language-processing module 107. In FIG. 1, the language processing module 107 includes an automated speech recognition (ASR) module 101 for the processing of speech. Given a natural language input in speech form, the ASR module 101 processes the natural language input, and outputs a transcription in the form of a token sequence, such as perhaps ("Play" "the" "third" "video") for the speech input "Play the third video". The language processing module 107 may also accept text input and include a text tokenizer 102 for transforming a textual input into a sequence of tokens specifying speech components and their associated textual values.

The language processing module 107 also includes a parser module 103 that achieves understanding of the language input (e.g., to interpret what a natural language command is asking for) and takes an action in response by processing the token sequence generated by the ASR module 101 or the tokenizer 102.

The parser module 103 processes the sequence of tokens output by the ASR module 101 or the tokenizer module 102 in terms of one or more grammars 104. In some embodiments, the grammars 104 are context-free grammars, such as Extended Backus-Naur Form (EBNF) grammars. As noted, the grammars 104 correspond to the devices 110 and describe the format of natural language expressions that may be used for those devices, e.g., for interacting with the visible elements of the graphic user interfaces of those devices. The grammars may be authored, for example, by the creators of the devices 110 and submitted for inclusion within the NLU engine 100. In some embodiments, the parser module 103 simply determines whether the sequence of tokens is grammatical according to the given grammar 104. In other embodiments, the parser module 103 specifies a meaning of the sequence of tokens by returning a data structure encoding the meaning; in such cases, the parser module 103 is referred to as a "semantic parser."

In some embodiments, the grammars 104 are implemented as blocks of code that have both (1) a grammar pattern that specifies the linguistical structure of valid expressions for that grammar, and (2) grammar actions to be performed when parsing the grammar pattern, as well as (3) a set of zero or more output variables (sometimes referred to as "slots") that represent the result of parsing a given natural language expression against the grammar.

Figure 2:
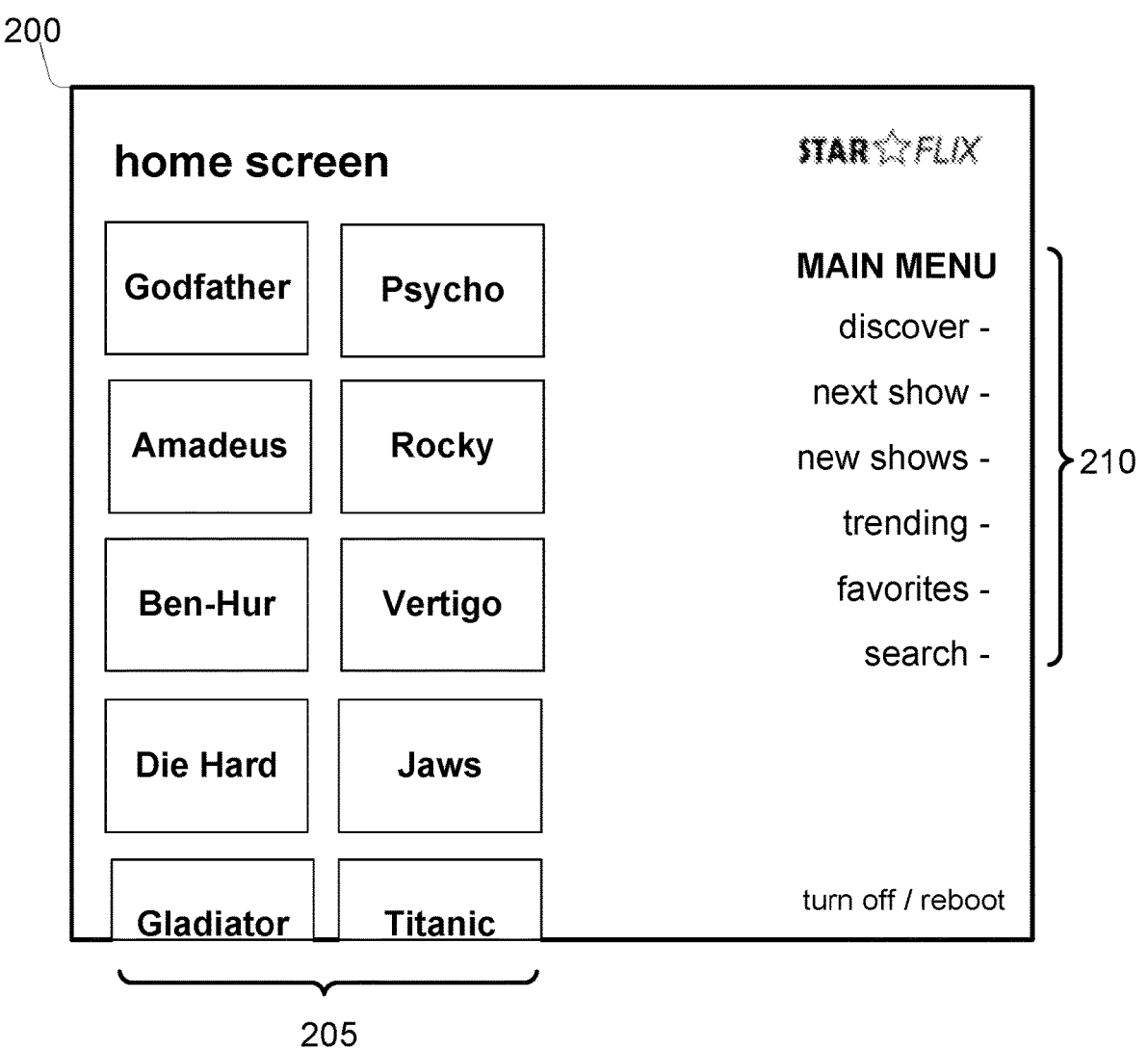
FIGS. 2-4 illustrate example graphical user interfaces for which the natural language commands may be used, according to some embodiments.

The grammars 104 provide the ability for users to specify interactions with visible elements of the graphical user interface. For example, FIG. 2 illustrates a graphical user interface 200 for a smart television. A search results area 205 displays elements representing films. For example, the user may have previously entered a query for action films, e.g., by entering "action films" as text, or by using a voice command such as "show me some action movies." It may be inconvenient for the user to interact with the user interface, e.g., to select one of the search result films for viewing. For example, touch screen interfaces would require the user to get up and walk over to the television. Relatedly, remote control devices can easily be misplaced, and further require unintuitive or inconvenient keystrokes to select one of the search result films. Accordingly, the example smart television uses the NLU engine 100 to allow the user to interact with the dynamic search result films using natural language commands, such as voice commands. For example, given the search results in the search results area 205, the user can simply say "play Ben-Hur" to select the search result by name, or "play the third one" to select the search result by an index (assuming that the numbering is arranged first by column, then by row within a column), or "play the movie in the first column, third row" (using a 2-D grid representation). The smart television could also use the NLU engine 100 to allow the user to interact via natural language commands with fewer dynamic user interface elements, such as the menu items in the menu area 210. For example, the user could say "select the third menu item" to select the "new shows" item of the menu.

Different grammars 104 may be used in different embodiments, or the designers of the different devices may author any number of their own customer grammars as appropriate for the graphical user interfaces of their devices. Several example grammars are now described.

One grammar 104 allows a visible element of the graphical user interface to be selected according to an index position, expressed as an integer or other numerical value. This is appropriate for graphical user interfaces in which the user interface elements (or some implicated subset thereof) can be conceptualized by the user as an ordered set of elements, with a clear first element. For example, the following general rule specifies one class of such grammars:

COMMAND::=VERB "the" NUMBERED ("one-"|NOUN)

The grammar named COMMAND can then be compared against tokenized text of natural language expressions to find expressions that match the pattern of a word from a set of words named VERB defined elsewhere, followed by the word "the," followed by a word from a set of words named NUMBERED defined elsewhere, followed by the word "one" or another word from a set of words named NOUN defined elsewhere.

```
NUMBERED ::= "first", "second", "third", "fourth", "fifth", "sixth",
"seventh", "eighth", "ninth", . . .
```

The set named NUMBERED above defines a list of words that would normally be found in the position of the variable NUMBERED in the COMMAND assignment above. These words are ordinal numbers, which would be appropriate for selecting an item from a list using natural language.

A grammar that is more flexible to accommodate different phrasings with the same intent, as appropriate for the above example of the selection of films from a result set of films, might be expressed by defining sets of words for the non-terminals VERB and NOUN in the COMMAND assignment above to support further alternative phrasings common within the natural language, as in the following rules:

```
VERB ::= "select" | "play"
NOUN = "film" | "movie"
```

Another grammar 104 allows a visible element of the graphical user interface to be selected using a pair of <row, column> numerical indexes, such as in the natural language command "play the movie in the third row and first column". This is appropriate for graphical user interfaces in which the user interface elements (or some implicated subset thereof) are arranged visually in a 2-D grid. For example, the following general rule specifies one class of such grammars:

```
COMMAND ::= VERB "the" ("one" | NOUN)
"in the" NUMBERED "row and"
NUMBERED "column"
NUMBERED ::= "first", "second", "third", "fourth",
"fifth", "sixth", "seventh", "eighth", "ninth", ...
```

Yet another grammar 104 allows for selection of user interface elements according to their assigned captions/names. For example, referring again to FIG. 2, the user could use the natural language command "play Ben-Hur". This is expressed by the grammar rule:

COMMAND::=VERB CAPTION

In the grammar rule immediately above named COMMAND, CAPTION represents a slot that can be filled by any element in a table that maps captions visible in the GUI to a descriptor. An example of a descriptor is the index of a GUI element to which each caption corresponds. The table CAPTION may be stored on the server, for embodiments in which the server maintains information of the current state of the GUI. The table CAPTION may also be populated with a list of GUI elements and captions displayed, wherein the list is provided from devices 110 to NLU engine 100 as a package of metadata with each command.

Still other grammars allow for the designation of different sub-sets of the user interface elements. For example, in the example of FIG. 2, the search results 205 could be designated separately from the menu items 210, e.g., with a query such as "in the search results, play the third one", or "select the menu item 'new shows'".

Of course, the grammars 104 can be written in any manner suitable for the domain of the graphical user interface of the devices 110 in question. Thus, although the above examples are simplified for purposes of illustration, other grammars 104 could be more complex and allow for more variations and greater flexibility for users. For example, the grammar for the grid example could be revised to allow natural language commands to use other than row followed by column, such as column followed by row. Rules of one grammar may of course also be combined with those of another to create a new, more expressive grammar. For example, the above examples (a single index, two indexes, a name) may be used together within a single grammar that permits the user to use any of these methods of designating a user interface element.

The software 112 of the devices 110 includes a UI context packaging module 114 that assembles metadata describing the visible elements of the graphical user interface with which the user may interact. The types of the visible elements can vary according to the graphical user interface of the device 110. In the example of FIG. 2, for example, the visible elements including the ten film search results (eight of which are entirely visible, and two of which are partially obscured beneath the bottom edge of the window) and the menu elements (for the "discover", "next show", "new shows", "trending", "favorites", and "search" menu items). The assembled metadata may be encoded in different formats in different embodiments. Examples include key-value pair-based formats such as JavaScript Object Notation (JSON), and schema-based markup languages such as Extensible Markup Language (XML). In embodiments employing JSON, the example of FIG. 2 might be encoded as follows, with the search results and UI controls each having an entry in a map data structure, and the members of each of these groups each having a list of <caption, index> pairs that permit users to reference the elements either by name or by index position.

```
{
"searchResults":[
    {"caption":"Godfather", "index":0, "filmID":17398283}
    {"caption":"Amadeus", "index":1, "filmID":783823883}
    {"caption":"Ben-Hur", "index":2, "filmID":7372933}
    {"caption":"Die Hard", "index":3, "filmID":48372888}
    {"caption":"Gladiator", "index":4, "filmID":47356837}
    {"caption":"Psycho", "index":5, "filmID":538792379}
    {"caption":"Rocky", "index":6, "filmID":57757588}
    {"caption":"Vertigo", "index":7, "filmID":90837299}
    {"caption":"Jaws", "index":8, "filmID":178438878}
    {"caption":"Titanic", "index":9, "filmID":28534729}
]
"UIcontrols":[
    {"caption":"discover", "index":0}
    {"caption":"next show", "index":1}
    {"caption":"new shows", "index":2}
    {"caption":"trending", "index":3}
    {"caption":"favorites", "index":4}
    {"caption":"search", "index":5}
]
}
```

Appendices A and B below provide additional examples of UI element metadata expressed in JSON.

The UI element identification module 109 identifies one or more visible user interface elements referenced by a natural language command, given contextual metadata describing the currently-visible user interface elements of the device 110 associated with the command. More specifically, the UI element identification module 109 first selects a grammar 104 that corresponds to the device 110 (e.g., the device from which the command was received). In some embodiments, the UI element identification module 109 identifies an organization (such as a television vendor, auto maker, healthcare provider, or vending machine manufacturer) associated with the device 110 (in the case of the NLU engine 100 supporting many different organizations in a multi-tenant manner), a functional type associated with the device (e.g., smart television model number or product ID), a device-specific identifier (e.g. device ID or user account information) and/or other attributes that determine which types of natural language commands should be supported. For example, the UI element identification module 109 might determine that the device 110 is associated with XYZ Corp., that the device is a smart television, and that a user with US-English as a preferred language is logged in, and that therefore a particular grammar G should be used to interpret natural language commands.

The UI element identification module 109 then uses the language-processing module 107 to parse the natural language command using the selected grammar. Assuming that the command is a valid expression in the selected grammar, the UI element identification module 109 further identifies which user interface element is selected based on (1) the result of the parsing and (2) the contextual metadata provided by the device 110. For example, refer again to the example of FIG. 2, and assume that the user spoke the natural language command "play the third one." The UI element identification module 109 would apply the selected grammar, determine that the natural language command properly conforms to that grammar, and that the selected element is the element at index 3. The UI element identification module 109 would accordingly search in the contextual metadata to identify the metadata corresponding to the selected element(s)—to continue the example of FIG. 2, the element with caption "Ben-Hur".

Appendices C and D provide example code that can be used by the UI element identification module 109 when handing a natural language command.

The UI element identification module 109 may additionally determine other attributes of the command, in addition to the identity of the user interface element to which the command refers, such as the type of action (e.g., "play" or "select"). The UI element identification module 109 infers which additional attributes to identify using the grammar 104 itself (e.g., the output variables (or "slots") specified by the grammar).

In some embodiments, the UI element identification module 109 additionally allows selection of elements other than those that are presently visible within the user interface. In such embodiments, the UI context packaging module 114 may also package metadata about elements that are not presently visible in the user interface, as well as those that are presently visible. The UI element identification module 109 may have a bias toward selecting elements that are visible, such as by increasing weights of elements that are visible and/or decreasing weights of elements that are not visible, using the weights to compute scores for each element, and selecting elements with higher scores rather than elements with lower scores.

In some embodiments, the UI context packaging module 114 assembles the contextual metadata to provide to the NLU engine 100 along with each natural language command. Accordingly, the NLU engine need not itself retain state related to the state of the user interface of the device 110. Thus, in embodiments in which the NLU engine 100 is implemented as a remote server of a set of servers, any given natural command can be passed to any server in the set, since the servers are not tasked with user interface state management on behalf of the devices 110.

In some embodiments, the server stores state information. Accordingly, the packaging module 114 can be minimal, device designers need not handle the management and passing of state information back and forth to the server, and bandwidth usage is minimized.

Figure 3:
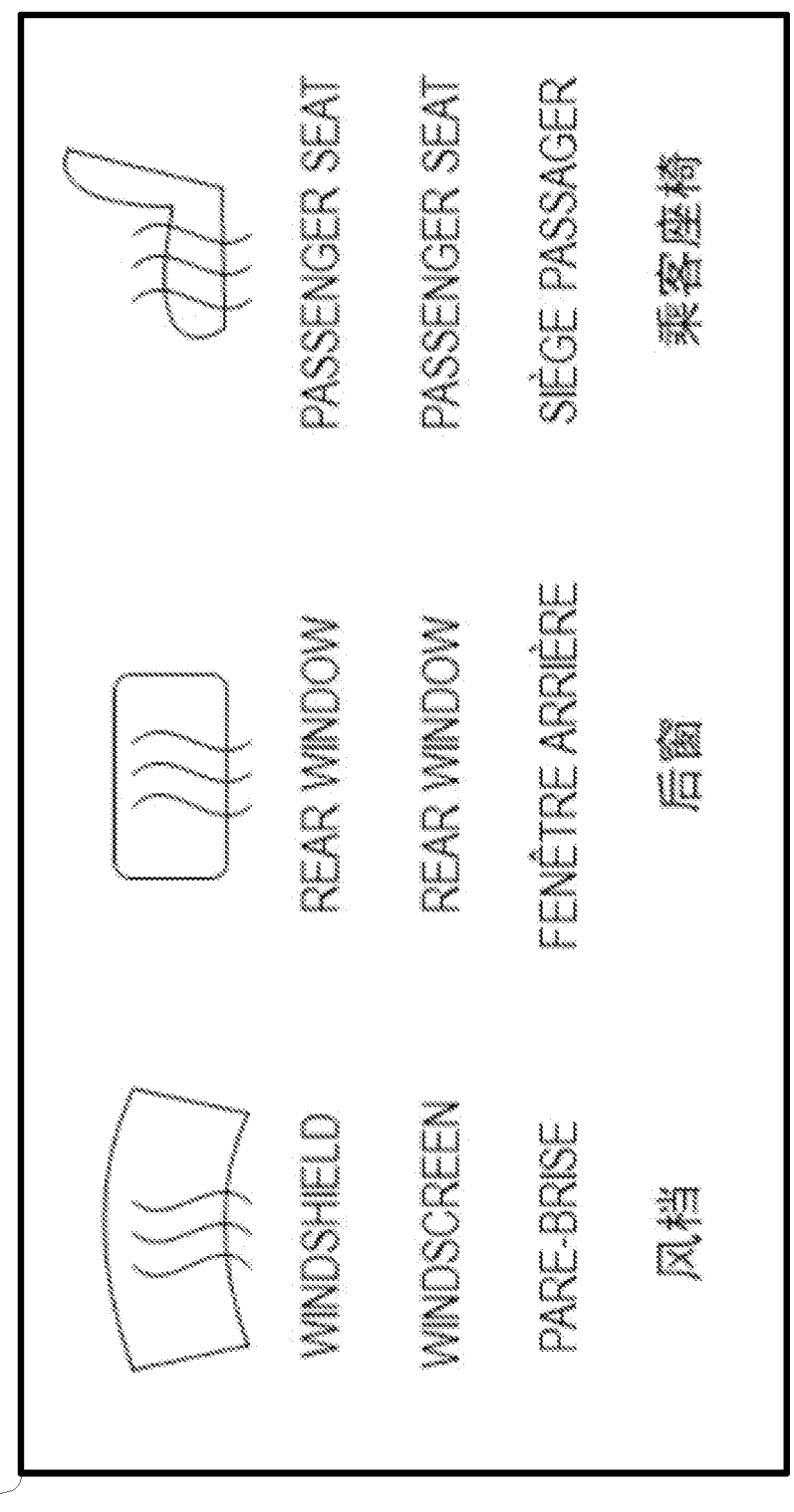

As another example of a user interface for which the NLU engine 100 could be used to enable natural language commands, FIG. 3 illustrates a graphical user interface 300 for a vehicle dashboard. A maker of the vehicle (for example) could design a grammar 104 to permit interaction with the vehicle elements displayed in the user interface 300, such the natural language commands "defrost rear window", "defrost the second one", "heat the third one", or the like. The embodiment of FIG. 3 includes one or more grammars supporting each of American English, British English, French, and Chinese. In some embodiments, context packaging module 114 detects a language mode setting within device 110 and conditionally identifies language-appropriate grammars and provides language-specific names of GUI objects with commands sent to NLU engine 100.

Figure 4:
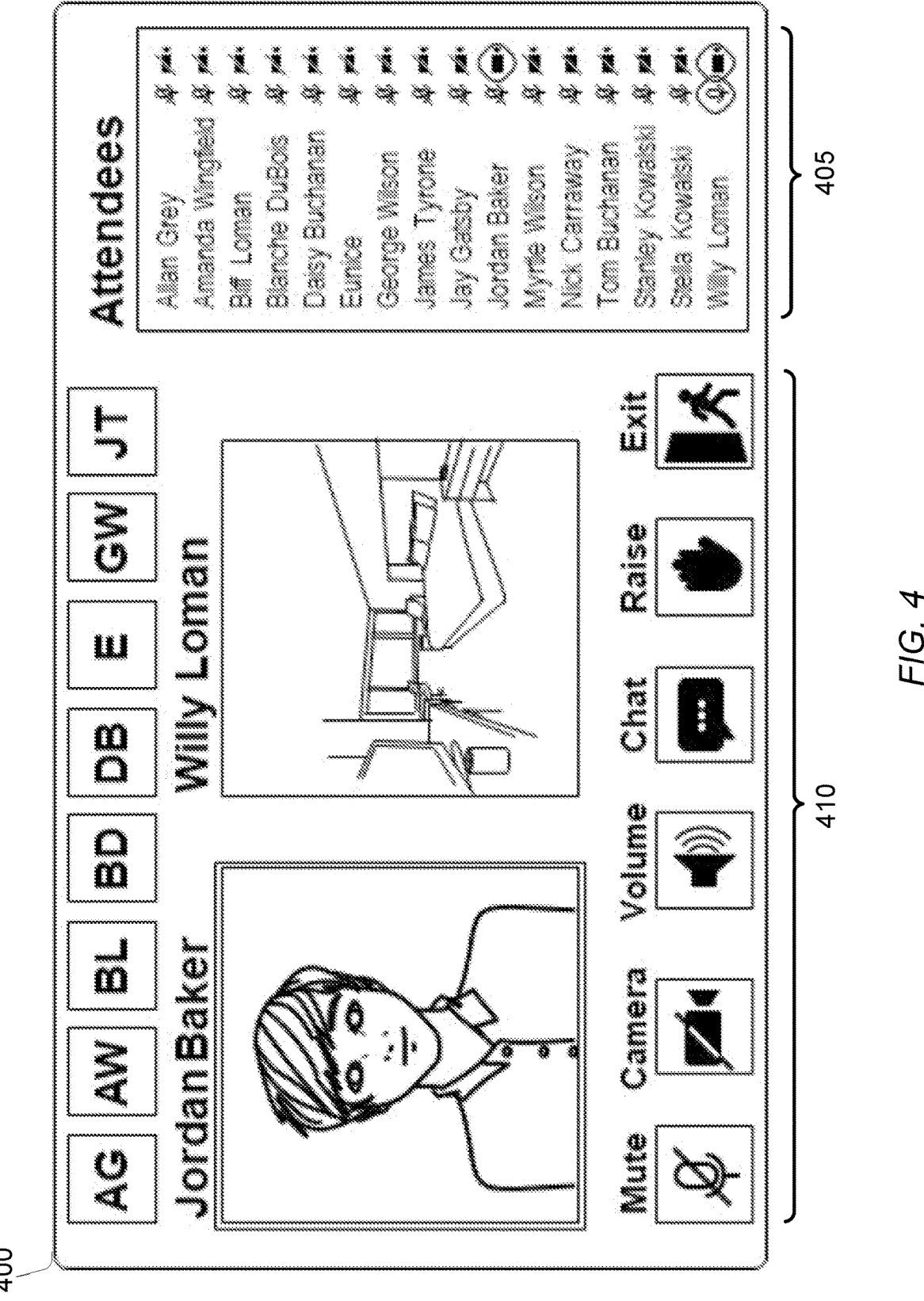

FIG. 4 is an example of a user interface for videoconferencing application. The user interface elements in area 405 represent the different meeting participants, who may come and go during the course of the videoconference. The user interface elements in area 410 represent the different controls for taking action in the video conference, such as enabling or disabling the audio, enabling or disabling the camera, changing the volume, and the like. Whereas the GUI of FIG. 3 has objects with specific names that can, optionally, be coded with the grammars 104, the GUI of FIG. 4 has names that would be unknown to the server. For such an embodiment, devices 110 send tables of names visible within the GUI such as the names of attendees currently in a video conference. The table of names may even include names of meeting attendees whose names are not currently displayed in the GUI. Furthermore, a video conferencing system such as the one shown in FIG. 4 will have dynamic state that is not known to the server. In particular, when attendees join or leave the meeting, devices 110 know, a video conferencing server might know of it, but the list of attendees at the moment of a natural language command may not be known to the NLU engine 100 and therefore, the full state of accessible information in devices 110 is sent to the NLU engine for parsing each command.

Returning to FIG. 1, in some embodiments the NLU engine 100 has a voice identification module 106 that can identify the user who provided a spoken natural language command, given the audio data for the natural language command, e.g., by comparing sound audio fingerprint data for the spoken natural language with stored samples of different registered users. Given identification of a speaker, the NLU engine can then provide additional personalization services that support commands that implicitly refer to the user. For example, for the spoken natural language command "put the third movie on my calendar for 4 PM", the reference to "my calendar" requires knowledge of the identity of the speaker. Given a grammar that can interpret such command and a device 110 with software 112 that knows how to act upon the results, as well as the voice identification module 106, such commands can be processed. For example, the grammar 104 could specify that parsing the sub-phrase "my calendar" involves resolving the identity of the user using the voice identification module, and performing a lookup in a database of user profile information to determine which calendar corresponds to that user. The NLU engine can return this as an output variable of the grammar, along with a descriptor of the UI element to which "the third one" corresponds. The device 110 can then take action based on this information namely, adding the film in question (as identified by the descriptor obtained from resolving the words "the third movie") to the relevant calendar involved (i.e., that of the user that is speaking).

Similarly, in some embodiments, the software 112 of the device 110 includes extra components that can supplement the natural language command with additional implicit context. For example, in some embodiments the software 112 includes a user gaze identification module 116 that determines which of various user interfaces (possibly on different devices) the user is looking at when the user specified the natural language command. For example, if the user said "select the third one" while in a room with various voice-enabled devices (or multiple monitors), the gaze identification module could determine, for a device, whether the user was looking at that device, and thus whether the device should send the natural language command and associated contextual metadata to the NLU engine 100. In some embodiments, each device has camera hardware and a gaze identification module 116, and each device can use the gaze identification module to determine whether the user was looking at it when making a natural language command; if the device was being looked at, it sends the natural language command the associated contextual metadata to the NLU engine; if it was not, it does not send the command.

Figure 5:
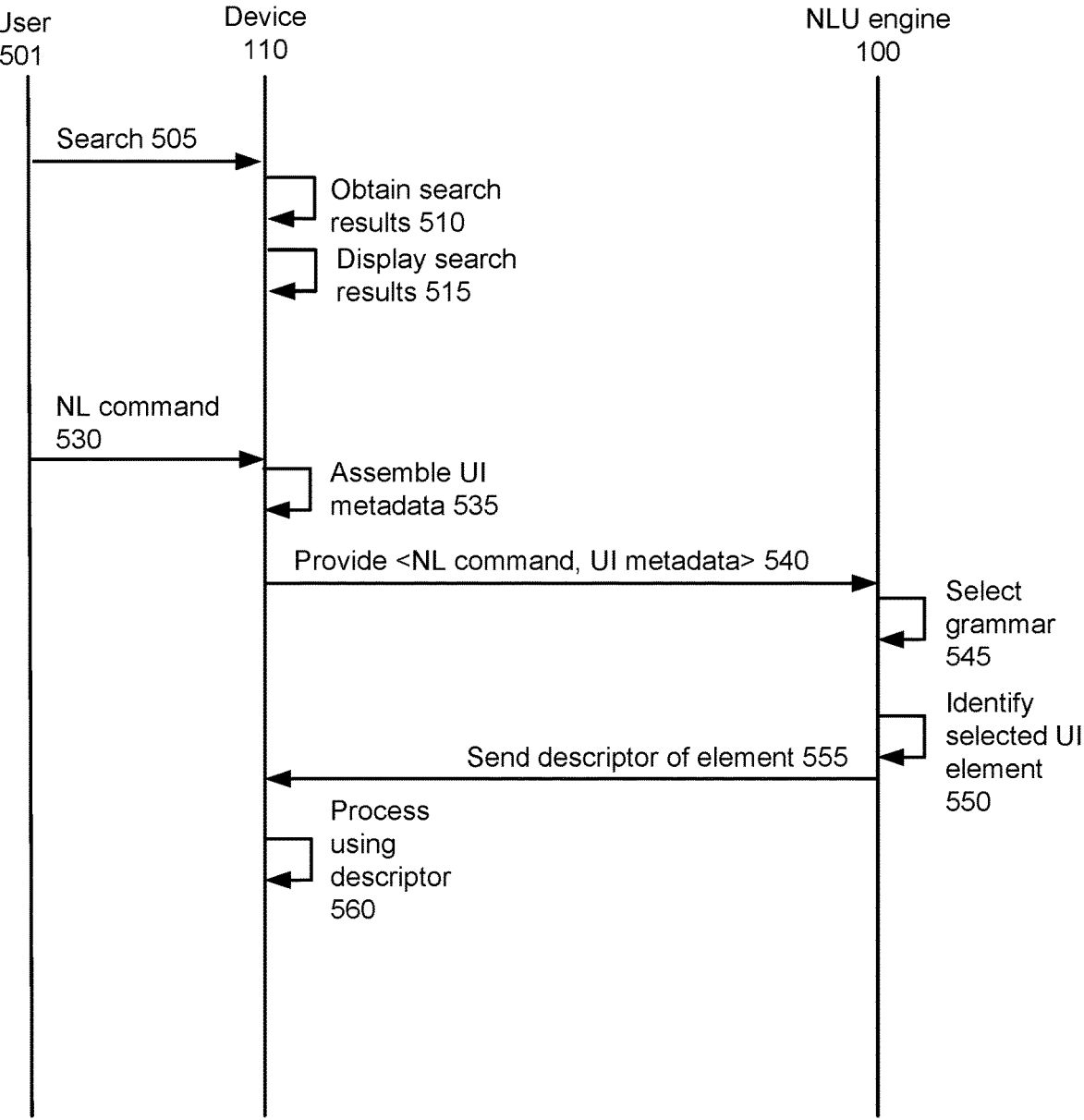
FIG. 5 is a sequence diagram illustrating the interactions between a user, a device, and the NLU engine in the context of obtaining and selecting search results in a user interface of a device, according to one embodiment.

FIG. 5 is a sequence diagram illustrating the interactions between a user 501, a device 110, and the NLU engine 100 in the context of obtaining and selecting search results in a user interface of a device, according to one embodiment. Steps 505-515 illustrate steps in obtaining and displaying search results in the user interface, and steps 530-560 illustrate steps in using a natural language command to interact with elements of the user interface, such as the search results.

In step 505, the user 501 searches 505 for items of interest. For example, in the example of FIG. 2, the user searched for action movies. The search could take place in any manner, such as with a natural language query (e.g., "Show me action movies"), with a click on a user interface element (e.g., representing the category of action movies), or the like. In the case of natural language queries, the NLU engine 100 could be used to interpret the natural language query, and (optionally) to execute the query once interpreted. In any case, the search results are obtained 510 (whether from the device 110, from an external database or server, from the NLU engine 100 itself, or the like) and displayed 515 within the graphical user interface of the device.

In step 530, the user 501 provides a natural language command. The natural language command may be in different forms in different embodiments, such as text, as marked-up text, as samples of audio, and/or as streams of audio. The UI context packaging module 114 on the device 110 accordingly assembles 535 UI metadata describing the currently-visible contents of the user interface of the device, such as the sample metadata provided above for the example of FIG. 2 (and, in some embodiments, also metadata describing elements that are not currently visible). The software 112 of the device 110 provides 540 the assembled UI metadata, along with the data for the natural language query itself, to the NLU engine 100. As noted above, in some embodiments the NLU engine 100 is implemented on one or more servers that are remote from the device 110 and accessed via the network 140, although in other embodiments the NLU engine can be incorporated locally as part of the device 110 (e.g., as an independent application process).

The NLU engine 100 selects 545 a grammar 104 that corresponds to the device 110. As discussed above, this may involve identification of the organization (e.g. manufacturer)

associated with the device and a type of the device (e.g., smart television) in order to identify the appropriate grammar. With the corresponding grammar 104 selected, the NLU engine 100 identifies 550 the selected UI element by parsing the natural language command with the language processing module 107 and using the result of the parsing to identify 550 the metadata of the selected element(s) within the provided contextual metadata, as described above with respect to the UI element identification module 109. The NLU engine 100 sends 555 a descriptor of the element(s) that were identified in step 550. The descriptor allows the device 110 to identify the UI element(s) that were referenced by the query. The descriptor's form may vary in different embodiments; for example, the descriptor may simply be the portion of the provided contextual metadata corresponding to identified elements.

The device 110 can then process 560 the natural language command, using the descriptor of the selected element(s), along with any other information returned by the NLU engine 100 (e.g., as output variables for the selected grammar). For example, in the above example of FIG. 2, if the user had specified the natural language command "play the third one", and the NLU engine 100 accordingly returned a descriptor of the film with the caption "Ben-Hur" as identifying the selected film, along with data indicating that the action is "play", the device could begin to play the film "Ben-Hur."

Although FIG. 5 provides an example in which search results are displayed, the natural language functionality provided by the NLU engine 100 and the NL software 112 of the device 110 can operate on data other than search results. For example, the same functionality also allows selection of components of the menu 210 of FIG. 2, for example.

Example Computer Architecture

Figure 6:
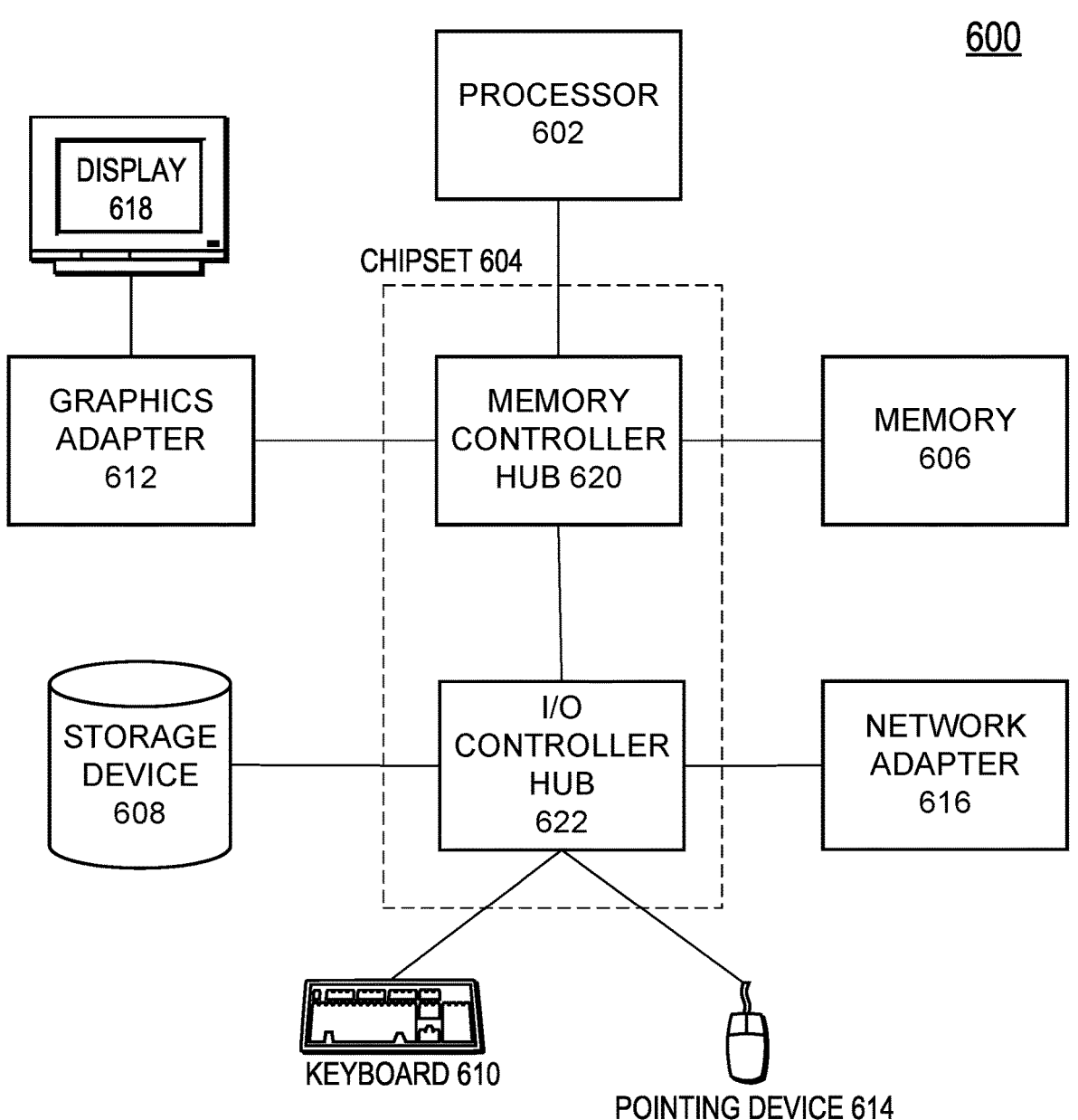
FIG. 6 is a high-level block diagram illustrating physical components of a computer used as part or all of the natural-language understanding server or device of FIG. 1, according to one embodiment.

FIG. 6 is a high-level block diagram illustrating physical components of a computer 600 used as part or all of the NLU engine 100 or device 110 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622, which are coupled to each other. In another embodiment, the memory 606 is coupled directly to the processor 602 instead of the chipset 604.

The storage device 608 is any non-transitory computer-readable storage medium, such as a hard drive, compact disk read-only memory (CD-ROM), digital versatile disc (DVD), or a solid-state memory device. The memory 606 holds instructions and data used by the processor 602. The pointing device 614 may be a mouse, track ball, or other type of pointing device, and is used in combination with the keyboard 610 to input data into the computer 600. A microphone (not shown) may also be used to input data into the computer 600 instead or in addition to the keyboard 610 and pointing device 614. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to any implementation of computer program logic utilized to provide the specified functionality. Thus, a module can be implemented in hardware, firmware, and/or software structures. In one embodiment, program modules are stored on the storage device 608, loaded into the memory 606, and executed by the processor 602.

Other Considerations

Reference in the specification to "one embodiment" or to "an embodiment" means that a particular feature, structure, or characteristic described in connection with the embodi- While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

APPENDIX A

Appendix A lists JavaScript Object Notation (JSON) code describing an example format for providing metadata about user interface elements. Specifically, a mandatory field named "Name" describes the name of an element, and an optional field named "PayloadJSON" describes data that will be returned if an element matches a user request.

```
[
    additional_fields_allowed := true,
    known_fields :=
    [
        [
            field_name := "Name",
            is_optional := false,
            field_type := json_string,
            description := "Name of the on screen item that will be matched against."
        ],
        [
            field_name := "PayloadJSON",
            is_optional := true,
            field_type := json_any_value,
            description := "JSON that will be returned in the response if matched"
        ] ]
]
``` ments is included in at least one embodiment. The appearances of the phrase "in one embodiment" in various places in the specification are not necessarily all referring to the same embodiment. The indefinite article "a" and "an" should be understood to include both the singular and the plural as appropriate for the context; thus "a block" should be understood for example to mean "at least one block".

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs that increase computing capability. It will be appreciated that a variety of programming languages may be used to implement the teachings of the present invention as described herein, and any references below to specific languages are provided for disclosure of enablement and best mode of the present invention.

APPENDIX B

Appendix B lists JavaScript Object Notation (JSON) code specifying metadata for UI elements (named "Netflix" and "Godfather") in the format of Appendix A.

```
{
"SmartTVOnScreenItems":{                    "Items": [
        {
            "Name": "Netflix",
            "PayloadJSON":{
                "ID": "1",
                "InternalName": "Netflix"
            }
        },
        {
            "Name": "Godfather",
            "PayloadJSON":{
                "ID": "2",
                "InternalName": "Godfather movie"
            }
        }
    ]
}
}
```

APPENDIX C

Appendix C lists in a C-like procedural programming language that converts the "Name" fields from Appendix B to natural language expressions in the NLU engine 100. It generates code for a block named "ON_SCREEN_NAVIGATABLE_ITEMS_TABLE". This block can APPENDIX C-continued

```
match "Name" fields in JSON and returns the PayloadJSON representations for corresponding
names.
extern table(RCHandle<SmartTVOnScreenItemJSON> data)
ON_SCREEN_NAVIGATABLE_ITEMS_TABLE( ) request_info{
    read_table{
        if(request_info->getJSON( ) == NULL ||
            !request_info->getJSON( )->hasSmartTVOnScreenItems( ) ||
            !request_info->getJSON( )->getSmartTVOnScreenItems( )->hasItems( ) ||
            request_info->getJSON( )->getSmartTVOnScreenItems( )->countOfItems( ) == 0 ){
            return;
        }
        for(auto item : request_info->getJSON( )->getSmartTVOnScreenItems( )->getItems( )){
            ON_SCREEN_NAVIGATABLE_ITEMS_TABLE_data row_data;
            row_data.data = items;
            table_data.add_row(item->getName( ), row_data);
        }
    }
}
```

APPENDIX D

```
Appendix D lists code in a C-like language designed to support natural language processing.
The code applies the ON_SCREEN_NAVIGATABLE_ITEMS_TABLE of Appendix C to
match a natural language pattern in the "interpret{ }" portion and form the data for the outnput
variables in the "as{ }" portion. Specifically, the block matches expressions like "navigate to
<ON_SCREEN_NAVIGATABLE_ITEMS_TABLE( )>".
ON_SCREEN_NAVIGATABLE_ITEMS_TABLE( ) corresponds to data generated in the code
of Appendix C. . The data for the matched item is passed in to
SmartTVOnScreenNavigationCommand, where the final response is generated and the query is
fulfilled.
//On screen navigation by name
    interpret{
        (100
        (
            ("go".[5 "to"]) |
            CHOOSE( ) |
            ("navigate". "to") |
            (1/10 SEARCH_CMND( ) )
            |
            play=(
            (1/1000 "play") | ("tune" . ["in"] . ["to"]) | (1/10 "start" .( "playing" |1/2
"watching"))
            )
            |
            (1/100 "open")
            |
            (1/100 "launch")
        )) .
        [1/2 "the"]
            .items=ON_SCREEN_NAVIGATABLE_ITEMS_TABLE( ) .
            [1/5 ( [2 ( ("on") | (1/2"in") | (1/5 "at") )] . apps = SMART_TV_APP_LIST( ) ) ]
    }
    as{
            std::vector<std::shared_ptr<const SmartTVApp>> app_list;
            if(apps){
                app_list = apps->apps;
            }
            query_result = new SmartTVOnScreenNavigationCommand(request_info, items->data,
play, app_list);
            outgoing_intra_query_state = incoming_intra_query_state;
    }
```

What is claimed is:

1. A computer-implemented method for identifying a user interface element referenced by a natural language command, the computer-implemented method comprising:

receiving, from a device, a natural language command and user interface metadata describing a set of user interface elements visible within a user interface of the device, the natural language command relating to selection of a user interface element of the set of user interface elements;

interpreting the natural language command using a grammar customized for the set of user interface elements, the customized grammar including rules for interpreting spatial positions of specific ones of the user interface elements and titles of specific ones of the user interface elements; and determining the user interface element identified in the natural language command through interpretation of the natural language command using the customized grammar;

wherein the user interface metadata is specified in one of a key-value pair-based format or a schema-based markup language.

2. The computer-implemented method of claim 1, wherein the natural language command is a voice command, the method further comprising converting the voice command to text.

3. The computer-implemented method of claim 1, further comprising the step of selecting a grammar corresponding to the device.

4. The computer-implemented method of claim 3, wherein the grammar is a context-free grammar containing a single ordinal number non-terminal.

5. The computer-implemented method of claim 3, wherein selecting the grammar comprises identifying an organization associated with the device.

6. The computer-implemented method of claim 3, wherein selecting the grammar comprises identifying a functional type associated with the device.

7. A computer-implemented method for interacting with a user interface of a device using a natural language command, the computer-implemented method comprising:

receiving a search request;

displaying, within a graphical user interface of the device, a set of search results corresponding to the search request;

receiving a natural language command from a user;

identifying a set of user interface elements visible within the graphical user interface of the device;

assembling user interface metadata describing the identified set of user interface elements;

interpreting the natural language command using a grammar customized for the set of user interface elements as described by the interface metadata, the customized grammar including rules for interpreting spatial positions of specific ones of the user interface elements;

determining a descriptor of a user interface element identified in the natural language command through interpretation of the natural language command using the customized grammar; and using the descriptor to respond to the natural language command;

wherein the user interface metadata is specified in one of a key-value pair-based format or a schema-based markup language.

8. The computer-implemented method of claim 7, wherein the natural language command is a voice command.

9. The computer-implemented method of claim 7, wherein the descriptor is determined by a natural language understanding (NLU) engine.

10. The computer-implemented method of claim 7, wherein the user interface metadata include, for each identified user interface element, a caption of the element.

11. A multi-tenant system comprising:

a computer processor; and a non-transitory computer-readable storage medium storing instructions that when executed by the computer processor perform actions comprising:

receiving, from a device, a natural language command and user interface metadata describing a set of user interface elements visible within a user interface of the device, the natural language command relating to selection of a user interface element of the set of user interface elements;

identifying, based on tenant-specific information associated with the device, an organization or device type corresponding to the device;

selecting, based on the identified organization or device type, a grammar customized for the set of user interface elements;

interpreting the natural language command using a grammar customized for the set of user interface elements, the customized grammar including rules for interpreting spatial positions of specific ones of the user interface elements and titles of specific ones of the user interface elements; and determining the user interface element identified in the natural language command through interpretation of the natural language command using the customized grammar;

wherein the user interface metadata is specified in one of a key-value pair-based format or a schema-based markup language.

12. The multi-tenant system of claim 11, wherein the natural language command is a voice command, the method further comprising converting the voice command to text.

13. The multi-tenant system of claim 11, further comprising the steps of selecting a grammar corresponding to the device, the grammar having a slot, and parsing the natural language command according to the selected grammar, the slot being filled by text, the text being matched to the user interface element.

14. The multi-tenant system of claim 13, wherein the grammar is a context-free grammar containing two numerical non-terminals indicating a row and a column of a selected one of the visible user interface elements.

15. The multi-tenant system of claim 13, wherein selecting the grammar comprises identifying an organization associated with the device.

16. The multi-tenant system of claim 13, wherein selecting the grammar comprises identifying a functional type associated with the device.

* * * * *